Feb. 9, 1932.  E. J. SCHLECHTER ET AL  1,844,797
GRAIN BLOWER UNIT
Filed Jan. 10, 1931  3 Sheets-Sheet 1
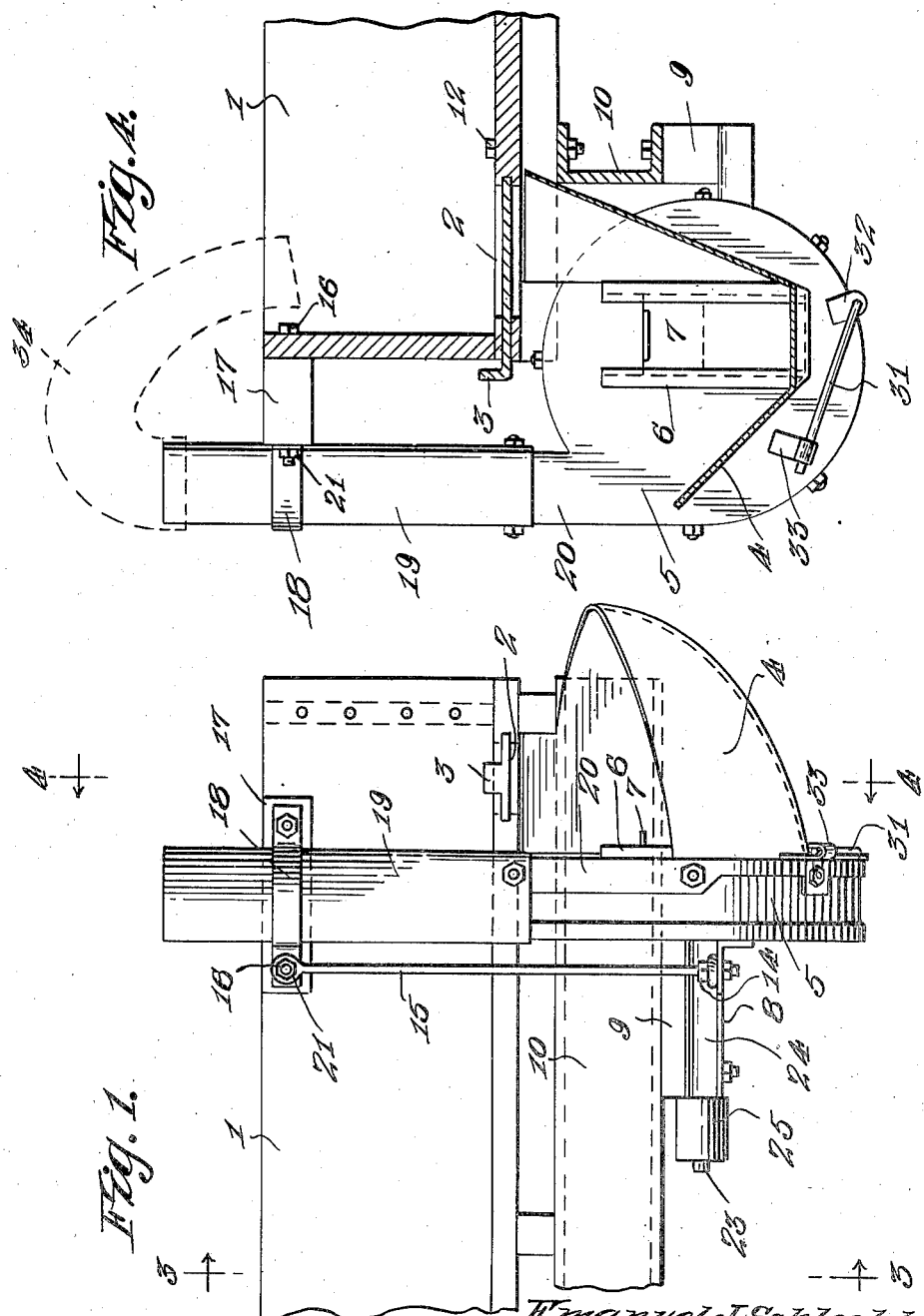

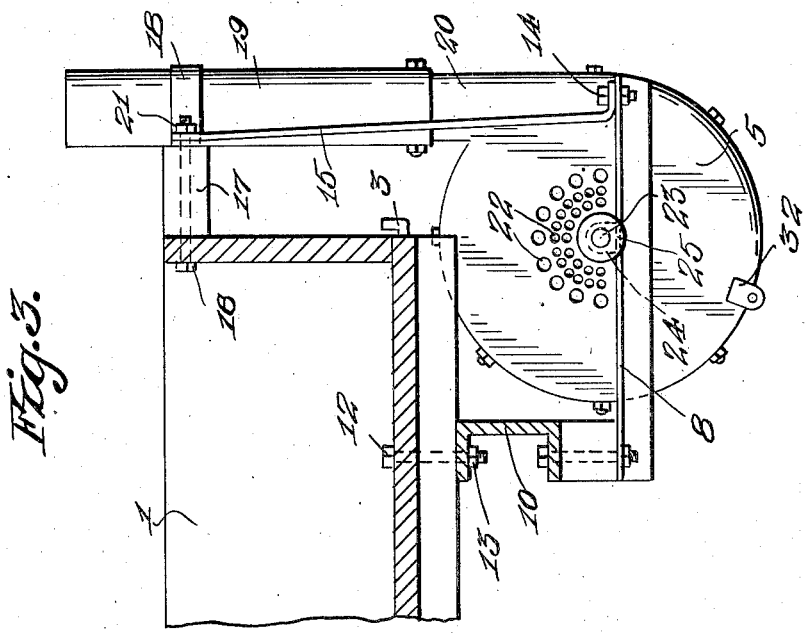
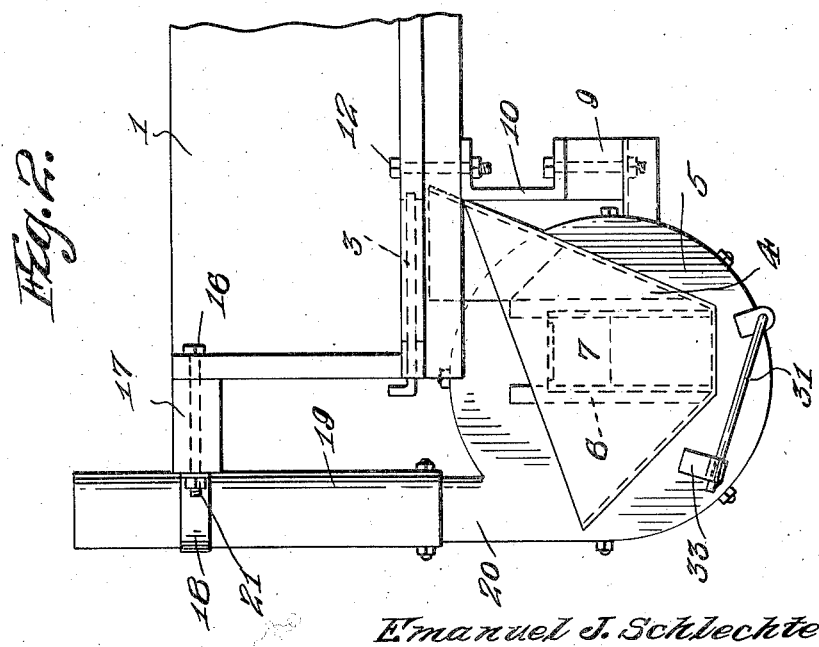

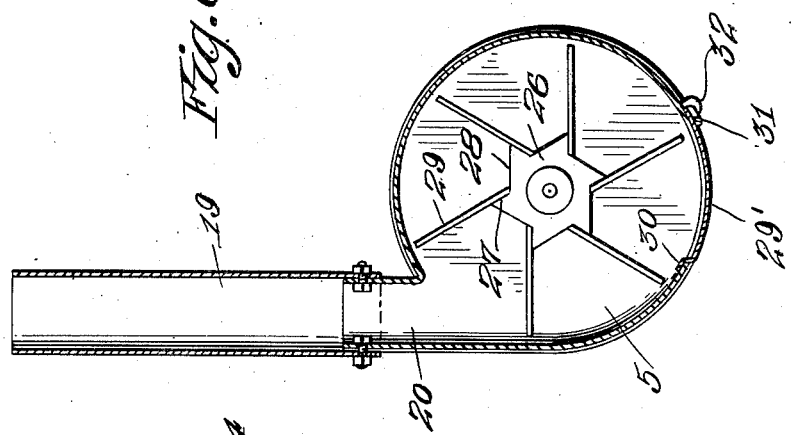
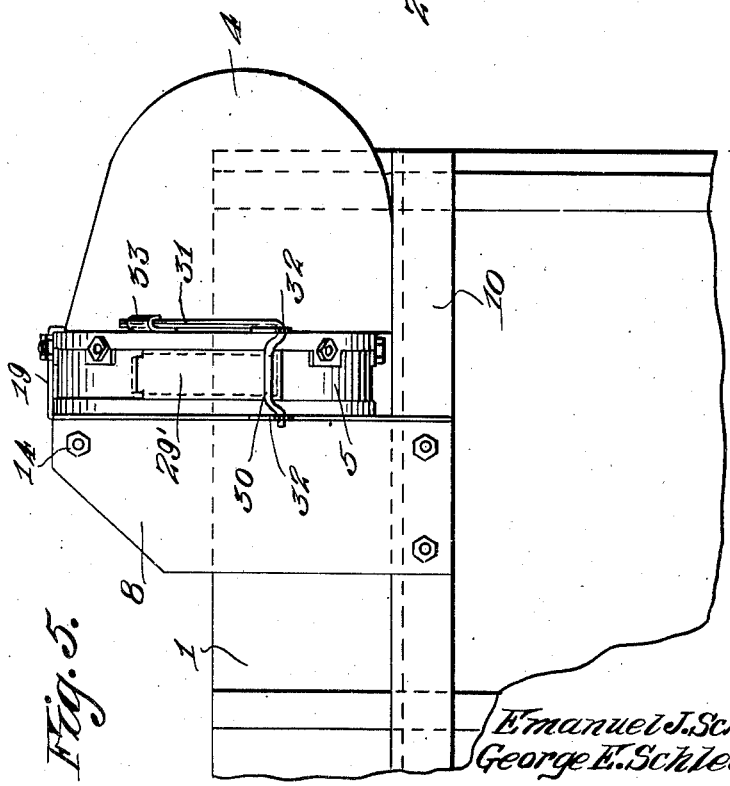

Patented Feb. 9, 1932

1,844,797

UNITED STATES PATENT OFFICE

EMANUEL J. SCHLECHTER AND GEORGE E. SCHLECHTER, OF WHITETAIL, MONTANA

GRAIN BLOWER UNIT

Application filed January 10, 1931. Serial No. 507,937.

The object of this, our present invention, is to provide a grain truck that has a power take-off with a blower unit which is of a simple nature and which may be successfully employed for quickly loading the truck body and after the grain is conveyed in a truck to a car or the like to quickly and effectively load the grain from the truck into the car.

A further object is the provision of a grain blower apparatus or unit which is removably attached to a truck in an easy, expeditious and rigid manner and which may be removed from the truck by the simple unscrewing of a small number or nuts or bolts.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom, as do not affect the spirit of the invention nor exceed the scope thereof as expressed in the appended claim.

In the drawings:

Figure 1 is a side elevation illustrating the improvement in applied position.

Figure 2 is an end view thereof.

Figure 3 is a sectional view approximately on the line 3—3 of Figure 1.

Figure 4 is a sectional view approximately on the line 4—4 of Figure 1.

Figure 5 is a bottom plan view of the device.

Figure 6 is an approximately central sectional view through the fan housing and its stack.

In the drawings we have not deemed it necessary to illustrate the power plant for the truck nor the pulley wheel that affords the power take-off therefor. In the present instance a hand operated lever may actuate clutch means for declutching and permitting the free running of the pulley or like means may be provided for shifting the power belt from a loose to a fixed pulley or vice versa.

The body 1 of the truck, at its bottom in front of the rear wheel is provided with an outlet opening 2, the said opening being normally closed by a slidable valve plate 3. Below the opening there is arranged the grain receiving hopper 4 of the improvement. The hopper is rigidly fixed on one of the faces of the cylindrical blower fan housing 5 and this face, from the rear wall of the inclined bottom of the hopper, is provided with a vertical opening and has guideways 6 along the sides of the opening for a slidable gate or valve 7. The suction fan housing 5, on the inner face thereof, that is, the face opposite that provided with the hopper 4, has rigidly fixed thereto the angle end of a horizontal plate 8, there being arranged over the plate spacer blocks 9 which are bolted to one of the channeled frame members 10 for the truck body 1. The spacer blocks afford a clearance for the drive belt between the shaft of the blower and the power take off of the truck motor. The rear as well as the inner side walls of the hopper are in close contact with the under face of the floor of the truck body 1, and preferably the upper face of the hopper, at the outer side and end walls thereof, is cut at a downward angle whereby grain may be readily deposited into the hopper.

The angle plate 8, at its outer end has secured thereto by a bolt 14 an upstanding brace rod 15, the second end of the rod having an eye that receives therethrough a bolt 16 which passes through a spacer block 17 on the end of the truck body 1. The bolt also passes through the ends of a strap 18 for holding the spout 19, which is connected to the outlet end 20 of the blower casing, in proper position. The bolt 16 is engaged by a nut 21. A second bolt passes through the side of the truck body and through the block 17 and connects to the said block the second end of the strap 18 and this bolt is likewise engaged by a nut.

By bolting our improvement to the truck the same can be readily arranged on or removed from said truck. This is one of the advantageous features of the improvement. The side of the blower casing or housing to which the angle plate 8 is connected has outer series of segmental apertures 22 therethrough, the said apertures being arranged above and partly surrounding the bearing opening for the shaft 23 for the blower fan. The shaft 23 is journaled through bearings 24 on the plate 18 and on the outer end of the shaft there is a fixed pulley wheel 25 for the belt that is trained around the power take-off pulley on the truck. The shaft has fixed on the end thereof received in the casing or housing 5 a member 26 somewhat in the nature of a ratchet wheel, the said member having equidistantly spaced peripheral angle surfaces and angle shoulders 27 between the said faces 28. On the angle shoulders 27 there are fixed the blades 29 of the fan blower.

The bottom of the casing or housing 5 has an opening therein and this opening is normally closed by a segmental plate 29 that has a lip 30 to pass through the opening and to contact with one of the lower walls of the casing or housing. The second end of the door or plate 29 is contacted by the offset and cranked end 30 of a lever 31. The straight portions of the crank 30 are journaled in bearings 32 that depend from the housings and the arm or lever 31 is designed to be received in a cross sectionally U-shaped keeper 33 on one side of the casing or housing 5 and whereby the door plate 29 is held in locked position for covering the opening in the bottom of the casing or housing. The door plate 29 is opened only when surplus grain is to be removed therefrom. The stack or spout 19 is designed to have attached thereto an elbow 34 (dotted lines Fig. 4), and with our improvement it will be readily apparent that when the door or valve 7 is opened and the valve 3 is closed and when the elbow 34 has its mouth arranged in the body 1 of the truck and the suction fan is rotated grain deposited in the hopper will flow into the fan housing and will be acted upon by the blades and be projected through the spout 19 and the extension 34 so that the truck may be shortly filled with the grain. Air is let into the housing through the apertures 22. When the truck body is filled with grain the power for the suction fan is cut off and the truck driven under its own power to the place where the grain is to be received or stored. The elbow 34 is arranged in a car or other receptacle for the grain after the truck has been driven along side of such car or the like. The suction fan is again brought into operation, the valve plate 3 is opened to a desired extent to permit of grain dropping through the opening 2 into the hopper 4. The valve plate 7 is arranged so that the grain will be received in the housing 5 to be again acted on by the fan blower in the housing which will elevate the grain through the spouts 19 and elbow 34 and in this manner the grain will be received in its repository in an expeditious manner and without the employment of manual labor. In this loading operation a pipe of desired length is connected to both the elbow and the spout.

It is believed that the construction and advantages of our improvement will be apparent to those skilled in the art to which the invention relates after the foregoing description has been read in connection with the accompanying drawings so that further detailed description will not be required.

Having described the invention, we claim:

A grain suction unit for motor driven trucks that have a power take-off, said unit including a casing, a suction fan revoluble therein, an outlet stack for the casing, having an outer elbow and means for revolving the suction fan from the power take-off of the truck, a hopper fixed on one of the sides of the casing, said side of the casing having an opening therein in a line with the inclined bottom of the hopper, vertical guides on the casing at the sides of the opening, a slidable door movable in the guides, the bottom of the truck body having an opening above and communicating with the hopper, a slidable valve for regulating the opening, the second side of the opening having series of apertures therethrough and having a horizontal plate secured thereto, a channeled member fixed to the plate for underlying the bottom beams of the truck frame and to be removably bolted thereto, a block on the side of the truck body with which the stack contacts, bolt members supporting the block, a strap around the stack through whose ends the bolt members pass, a brace rod removably secured to the horizontal plate and engaged by one of the bolts and said bolts having nuts screwed thereon.

In testimony whereof we affix our signatures.

EMANUEL J. SCHLECHTER.
GEORGE E. SCHLECHTER.